United States Patent
Bhagwagar et al.

(10) Patent No.: US 10,155,858 B2
(45) Date of Patent: Dec. 18, 2018

(54) CURABLE COMPOSITION, CURED PRODUCT FORMED FROM THE CURABLE COMPOSITION, AND METHOD OF FORMING THE CURED PRODUCT

(71) Applicant: Dow Corning Corporation, Midland, MI (US)

(72) Inventors: Dorab E Bhagwagar, Saginaw, MI (US); Jing Jiang, Iowa City, IA (US); William J Schulz, Jr., Peoria, AZ (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/115,317

(22) PCT Filed: Mar. 10, 2015

(86) PCT No.: PCT/US2015/019557
§ 371 (c)(1),
(2) Date: Jul. 29, 2016

(87) PCT Pub. No.: WO2015/142558
PCT Pub. Date: Sep. 24, 2015

(65) Prior Publication Data
US 2017/0002174 A1 Jan. 5, 2017

Related U.S. Application Data

(60) Provisional application No. 61/954,108, filed on Mar. 17, 2014, provisional application No. 62/109,814, filed on Jan. 30, 2015.

(51) Int. Cl.
| | |
|---|---|
| C08K 3/36 | (2006.01) |
| C08G 77/388 | (2006.01) |
| C09D 4/06 | (2006.01) |
| C08F 222/10 | (2006.01) |
| C08K 9/06 | (2006.01) |

(52) U.S. Cl.
CPC .......... C08K 3/36 (2013.01); C08F 222/1006 (2013.01); C08G 77/388 (2013.01); C09D 4/06 (2013.01); C08K 9/06 (2013.01)

(58) Field of Classification Search
CPC .......... C08K 3/36; C08K 9/06; C08G 77/388; C09D 4/06; C08F 222/1006; C08F 283/12; C08F 2222/1053; C08F 220/24
See application file for complete search history.

(56) References Cited

U.S. PATENT DOCUMENTS

| | | |
|---|---|---|
| 5,378,735 A | 1/1995 | Hosokawa et al. |
| 5,418,304 A | 5/1995 | Mueller et al. |
| 5,714,557 A | 2/1998 | Kunzler et al. |
| 5,831,110 A | 11/1998 | Isoda et al. |
| 5,840,428 A | 11/1998 | Blizzard et al. |
| 6,376,576 B2 | 4/2002 | Kang et al. |
| 7,173,778 B2 | 2/2007 | Jing et al. |
| 8,178,613 B2 | 5/2012 | Nakashima et al. |
| 2004/0181008 A1 | 9/2004 | Hanazawa et al. |
| 2005/0256286 A1 | 11/2005 | Asch et al. |
| 2006/0106187 A1 | 5/2006 | Kennedy |
| 2010/0149262 A1 | 6/2010 | Lin et al. |
| 2011/0135905 A1* | 6/2011 | Wakita et al. ........ C08F 283/12 428/221 |
| 2011/0195256 A1 | 8/2011 | Morikawa et al. |
| 2017/0009014 A1* | 1/2017 | Bhagwagar et al. ......... C09D 183/08 |

FOREIGN PATENT DOCUMENTS

| | | |
|---|---|---|
| JP | 2011-114835 A | 4/2001 |
| JP | 2001240774 A | 9/2001 |
| JP | 2007297543 A | 11/2007 |
| KR | 700684 B1 | 3/2007 |

OTHER PUBLICATIONS

PCT/US2015/019557 International Search Report dated May 29, 2015.

* cited by examiner

*Primary Examiner* — Nathan M Nutter

(57) ABSTRACT

A curable composition comprises (A) a polyfunctional acrylate; (B) a fluoro-substituted compound having an aliphatic unsaturated bond; (C) an organopolysiloxane having at least one acrylate group; and (D) a reinforcing filler. A cured product formed by curing the curable composition is also disclosed. A method of forming the cured product comprises applying the curable composition on a substrate. The method further comprises curing the curable composition on the substrate so as to form the cured product on the substrate.

14 Claims, 1 Drawing Sheet

Figures 1A, 1B, 1C, 1D:
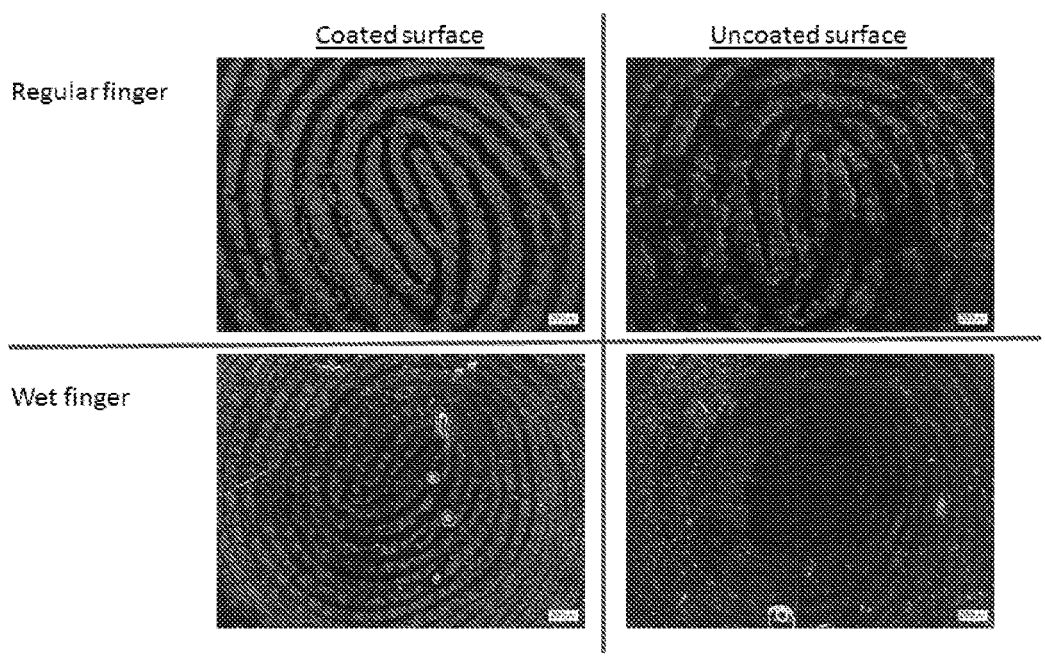

CURABLE COMPOSITION, CURED PRODUCT FORMED FROM THE CURABLE COMPOSITION, AND METHOD OF FORMING THE CURED PRODUCT

CROSS REFERENCE TO RELATED APPLICATIONS

This application is a U.S. national stage filing under 35 U.S.C. § 371 of PCT Application No. PCT/US2015/019557 filed on Mar. 10, 2015, which claims the benefit of U.S. Provisional Patent Application No. 61/954,108 filed under 35 U.S.C. § 119 (e) on Mar. 17, 2014 and U.S. Provisional Patent Application No. 62/109,814 filed under 35 U.S.C. § 119 (e) on Jan. 30, 2015. PCT Application No. PCT/US2015/019557 and U.S. Provisional Patent Application Nos. 61/954,108 and 62/109,814 are hereby incorporated by reference.

FIELD OF THE INVENTION

The present invention generally relates to a curable composition and, more specifically, to a curable composition suitable for forming a cured product having excellent physical properties and to a method of forming the cured product from the curable composition.

DESCRIPTION OF THE RELATED ART

Fluorinated compounds are known in the art and are utilized in various applications and end uses. For example, fluorinated compounds are commonly utilized in curable compositions. The curable compositions are applied to substrates and cured to form layers or coatings on the substrates.

Layers formed from curable compositions comprising fluorinated compounds may have diverse and desirable physical properties contingent on the components of the curable compositions. Such layers may be utilized to modify or improve physical properties of or otherwise protect the substrate. For example, certain layers are commonly utilized for smudge and stain resistance or to provide surfaces that are easy to clean. Other layers are utilized for providing protection to the underlying substrate, such as water repellency and/or resistance to scratching.

It is desirable for the curable compositions to have excellent physical properties, such as storage stability. Such physical properties associated with the curable compositions must be balanced with the desired properties of the resulting layers formed from the curable compositions. For example, it is desirable for the layers to have high adhesion to the substrate while providing scratch resistance and easy to clean surfaces.

SUMMARY OF THE INVENTION

The invention provides a curable composition. The curable composition comprises (A) a polyfunctional acrylate; (B) a fluoro-substituted compound having an aliphatic unsaturated bond; (C) an organopolysiloxane having at least one acrylate group; and (D) a reinforcing filler.

The invention additionally provides a cured product. The cured product is formed by curing the curable composition.

Finally, the invention provides a method of forming the cured product. The method comprises applying the curable composition on a substrate. The method further comprises curing the curable composition on the substrate so as to form the cured product on the substrate.

BRIEF DESCRIPTION OF THE DRAWING(S)

FIGS. 1a to 1d are photographic images of fingerprints on plastic boards.

DETAILED DESCRIPTION OF THE INVENTION

The invention provides a curable composition. The curable composition may be utilized to form a cured product by curing the curable composition, as described below. The cured product has excellent physical properties and is suitable for many different end uses and applications.

The curable composition comprises (A) a polyfunctional acrylate. By "polyfunctional," with reference to the polyfunctional acrylate (A), means that the polyfunctional acrylate (A) has two or more acrylate functional groups. In certain embodiments, the polyfunctional acrylate (A) has at least 3, alternatively at least 4, alternatively at least 5, alternatively at least 6, alternatively at least 7, alternatively at least 8, alternatively at least 9, alternatively at least 10, acrylate functional groups. Higher numbers of acrylate functional groups may also be suitable, e.g. an icosafunctional acrylate. The polyfunctional acrylate (A) may be monomeric, oligomeric, or polymeric in nature, and may comprise combinations thereof. For example, the polyfunctional acrylate (A) may comprise a combination of a monomeric polyfunctional acrylate and an oligomeric polyfunctional acrylate. The polyfunctional acrylate (A) may be linear, branched, or a combination of linear and branched polyfunctional acrylates.

The polyfunctional acrylate (A) may be organic or silicone-based. When the polyfunctional acrylate (A) is organic, the polyfunctional acrylate (A) comprises a carbon-based backbone or chain, optionally with heteroatoms, such as O, therein. Alternatively, when the polyfunctional acrylate (A) is silicone-based, the polyfunctional acrylate (A) comprises a siloxane-based backbone or chain comprising silicon-oxygen bonds. The polyfunctional acrylate (A) may comprise both carbon-based bonds and silicon-oxygen bonds, such as if the polyfunctional acrylate (A) is formed via hydrosilylation, in which case the polyfunctional acrylate (A) is still referred to as being silicone-based due to the presence of silicon-oxygen bonds therein. In certain embodiments, when the polyfunctional acrylate (A) is organic, the polyfunctional acrylate (A) is free from any silicon-oxygen bonds, alternatively free from any silicon atoms. Typically, the polyfunctional acrylate (A) is organic.

Specific examples of polyfunctional acrylates suitable for the purposes of (A) include: difunctional acrylate monomers, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate and bisphenol A dimethacrylate; trifunctional acrylate monomers, such as trimethylolpropane triacrylate, trimethylolpropane trimethacrylate, pentaerythritol monohydroxytriacrylate and trimethylolpropane triethoxytriacrylate; tetrafunctional acrylate monomers, such as pentaerythritol tetraacrylate and ditrimethylolpropane tetraacrylate; penta- or higher polyfunctional monomers, such as dipentaerythritol hexaacrylate and dipentaerythritol (monohydroxy)pentaacrylate; bisphenol A epoxy diacrylate; hexafunctional aromatic urethane acrylate, aliphatic urethane diacrylate, and an acrylate oligomer of tetrafunctional polyester acrylate.

The polyfunctional acrylate (A) may comprise a single polyfunctional acrylate or any combination of two or more polyfunctional acrylates. In certain embodiments, the polyfunctional acrylate (A) comprises a penta- or higher polyfunctional acrylate, such as any polyfunctional acrylate from a pentafunctional acrylate to an icosafunctional acrylate, which may improve curing of the curable composition. For example, in certain embodiments, the polyfunctional acrylate (A) comprises the penta- or higher polyfunctional acrylate in an amount of at least 30, alternatively at least 50, alternatively at least 75, alternatively at least 80, percent by weight based on the total weight of (A). Typically, the polyfunctional acrylate (A) is free from any fluorine atoms, such as in fluoro-substituted groups.

The curable composition further comprises (B) a fluoro-substituted compound having an aliphatic unsaturated bond. As with (A), the fluoro-substituted compound (B) may be organic or silicone-based, as described above. The aliphatic unsaturated bond may be a carbon-carbon double bond (C=C) or a carbon-carbon triple bond (C≡C), although the aliphatic unsaturated bond is typically a double bond. The fluoro-substituted compound (B) may have one aliphatic unsaturated bond or two or more aliphatic unsaturated bonds. The aliphatic unsaturated bond may be located at any position within the fluoro-substituted compound (B), e.g. the aliphatic unsaturated bond may be terminal, pendant, or a part of a backbone of the fluoro-substituted compound (B). When the fluoro-substituted compound (B) includes two or more aliphatic unsaturated bonds, each aliphatic unsaturated bond may be independently located in the fluoro-substituted compound (B), i.e., the fluoro-substituted compound (B) may include pendant and terminal aliphatic unsaturated bonds, or other combinations of bond locations.

In certain embodiments, the fluoro-substituted compound (B): (i) is partially fluorinated; (ii) comprises a perfluoropolyether segment; or (iii) both (i) and (ii). By partially fluorinated, it means that the fluoro-substituted compound (B) is not perfluorinated. For example, partially fluorinated encompasses mono-substitution, where there is but one fluoro-substituted group, and polyfluorination, where there are two or more fluoro-substituted groups. When the fluoro-substituted compound (B) is both (i) and (ii), the fluoro-substituted compound (B) includes a substituent, moiety, or group that is not perfluorinated such that although the fluoro-substituted compound (B) comprises a perfluorinated segment, the fluoro-substituted compound (B) as molecule is not perfluorinated, but rather polyfluorinated.

When the fluoro-substituted compound (B) comprises the perfluoropolyether segment, specific examples of moieties that may be present in the perfluoropolyether segment include —(CF$_2$)—, —(CF(CF$_3$)CF$_2$O)—, —(CF$_2$CF(CF$_3$)O)—, —(CF(CF$_3$)O)—, —(CF(CF$_3$)—CF$_2$)—, —(CF$_2$—CF(CF$_3$))—, and —(CF(CF$_3$))—. Such moieties may be present in any order within the perfluoropolyether segment and may be in randomized or block form. Each moiety may independently be present two or more times in the perfluoropolyether segment. Generally, the perfluoropolyether segment is free from oxygen-oxygen bonds, with oxygen generally being present as a heteroatom between adjacent carbon atoms so as to form an ether linkage. The perfluoropolyether segment is typically terminal, in which case the perfluoropolyether segment may terminate with a CF$_3$ group.

In one specific embodiment when the fluoro-substituted compound (B) comprises the perfluoropolyether segment, the perfluoropolyether segment comprises moieties having the general formula (1):

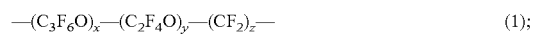

$$—(C_3F_6O)_x—(C_2F_4O)_y—(CF_2)_z— \quad (1);$$

wherein subscripts x, y, and z are each independently selected from 0 and an integer from 1 to 40, with the proviso that all three of x, y, and z are not simultaneously 0. If x and y are both 0, then z is an integer from 1 to 40 and at least one other perfluoroether moiety is present in the perfluoropolyether segment. The subscripts y and z may be 0 and x is selected from integers from 1 to 40, alternatively the subscripts x and y is 0 and z is selected from integers from 1 to 40; alternatively the subscripts x and z is 0 and y is selected from integers from 1 to 40. The subscript z may be 0 and x and y are each independently selected from integers from 1 to 40, alternatively the subscript y is 0 and x and z are each independently selected from integers from 1 to 40; alternatively the subscript x is 0 and y and z are each independently selected from integers from 1 to 40. Typically, x, y, and z are each independently selected from integers from 1 to 40. The moieties represented by subscripts x and y may be independently branched or linear. For example, (C$_3$F$_6$O) may independently be represented by CF$_2$CF$_2$CF$_2$O, CF(CF$_3$)CF$_2$O or CF$_2$CF(CF$_3$)O.

In certain embodiments, the fluoro-substituted compound (B) comprises the reaction product of a reaction of: (a) a triisocyanate and (b) a mixture of (b-1) a perfluoropolyether compound having an active hydrogen atom and (b-2) a monomeric compound having an active hydrogen atom and a functional group other than the active hydrogen atom.

The triisocyanate (a) may be formed by, for example, trimerizing a diisocyanate. Examples of suitable diisocyanates include those having aliphatically bonded isocyanate groups, such as hexamethylene diisocyanate, isophorone diisocyanate, xylylene diisocyanate, hydrogenated xylylene diisocyanate and dicyclohexylmethane diisocyanate; and diisocyanates having aromatically bonded isocyanate groups, such as tolylene diisocyanate, diphenylmethane diisocyanate, polymethylenepolyphenyl polyisocyanate, tolidine diisocyanate and naphthalene diisocyanate.

Specific examples of the triisocyanate (a) include the following:

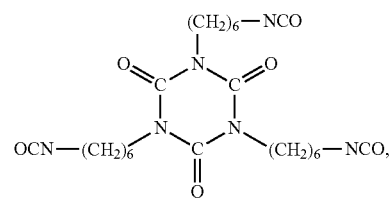

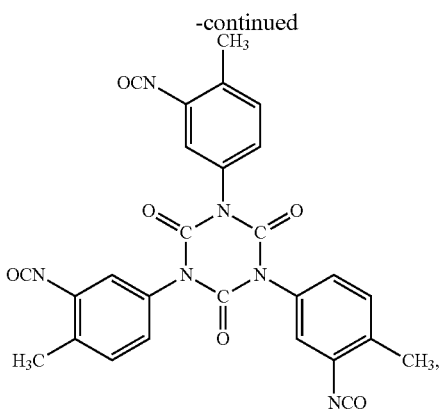

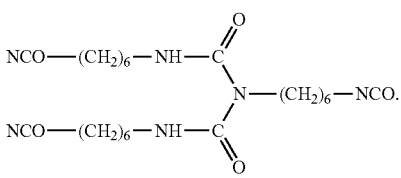

The perfluoropolyether compound (b-1) and the monomeric compound (b-2) each have an independently selected active hydrogen atom. Components (b-1) and (b-2) may independently have two or more active hydrogen atoms. The heteroatom bearing the active hydrogen atom is capable of reacting with an isocyanato functional group of the triisocyanate (a). One of skill in the art readily understands such active hydrogen atoms and corresponding functional groups including these active hydrogen atoms that are reactive with isocyanate functional groups. In various embodiments, the active hydrogen atom of components (b-1) and/or (b-2) is covalently bonded with (or to) oxygen (O), nitrogen (N), phosphorus (P) or sulfur (S). In these embodiments, the active hydrogen atom of component (b-2) is part of a reactive group. Examples of these reactive groups containing the active hydrogen include those comprising hydroxyl functionality (—OH), amino functionality (—$NH_2$), mercapto functionality (—SH), —NH—, and a phosphorus-hydrogen bond (—PH—). Such reactive groups may be substituents of components (b-1) and/or (b-2) or may be moieties or portions of substituents or functionalities, as described below.

Specific examples of reactive groups containing hydroxyl functionality include mono- to tetra-hydric alcohol groups, such as those comprising a $C_1$-$C_{20}$ hydrocarbyl group. The $C_1$-$C_{20}$ hydrocarbyl group may be aliphatic (branched or linear), aromatic, cyclic, alicyclic, etc. The $C_1$-$C_{20}$ hydrocarbyl group may be substituted or unsubstituted. By "substituted," it is meant that one or more hydrogen atoms of the hydrocarbyl group may be formally replaced with atoms other than hydrogen (e.g. a halogen atom, such as chlorine, fluorine, bromine, or iodine.); alternatively oxygen, sulfur, or nitrogen. Alternatively, the hydroxyl functionality may be bonded to components (b-1) and/or (b-2) in the absence of such a hydrocarbyl group. For example, the hydroxyl functionality may be present in the form of a silanol group (SiOH).

Specific examples of reactive groups containing amino functionality (—$NH_2$) include primary amine groups (—$RNH_2$), where R is a $C_1$-$C_{20}$ hydrocarbyl group as described immediately above.

Specific examples of reactive groups containing mercapto functionality include 1 to 4 SH groups such as those comprising a $C_1$-$C_{20}$ hydrocarbyl group, which is described above.

Specific examples of reactive groups containing —NH— include, in addition to a secondary amine group, other —NH— containing molecules, such as nitrogen-containing 6-membered ring structures, such as a piperazinyl group and a piperidinyl group; nitrogen-containing five-membered ring structures, such as a pyrrolidinyl group (excluding a 1-pyrrolidinyl group), a pyrrolyl group (excluding a 1-pyrrolyl group), a pyrrolinyl group (excluding a 1-pyrrolinyl group), an imidazolyl group (excluding a 1-imidazolyl group) and a pyrazolyl group (excluding a 1-pyrazolyl group); and nitrogen-containing condensed polycyclic structures, such as an indolyl group (excluding a 1-indolyl group), an indazolyl group (excluding a 1-indazolyl group), a purinyl group (excluding a 7-purinyl group), a perimidinyl group (excluding a 1-perimidinyl group) and a carbazolyl group (excluding a 9-carbazolyl group).

Specific examples of reactive groups containing a phosphorus-hydrogen bond (—PH—) include phosphorus-containing cyclic structures, such as a phosphindolyl group (excluding a 1-phosphindolyl group).

The perfluoropolyether compound (b-1) generally comprises a perfluropolyether segment. The perfluoropolyether segment of the perfluoropolyether compound (b-1) typically becomes the perfluoropolyether segment, if present, of the resulting fluoro-substituted compound (B) formed in part from the perfluoropolyether compound (b-1), as described below. The perfluoropolyether compound (b-1) is typically linear. In certain embodiments, the perfluoropolyether compound (b-1) has at least one terminal hydroxy group, alternatively two or more terminal hydroxyl groups. When the perfluoropolyether compound (b-1) contains two or more terminal hydroxyl groups, the hydroxyl groups may be located at the same or opposite terminals of the perfluoropolyether compound (b-1). As described above, the terminal hydroxyl group may constitute the active hydrogen of the perfluoropolyether compound (b-1).

The perfluoropolyether compound (b-1) typically has a molecular weight of from 200 to 500,000, alternatively from 500 to 10,000,000.

In one specific embodiment, the perfluoropolyether compound (b-1) has the following general formula:

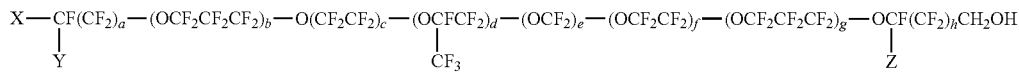

wherein X is F or a —CH$_2$OH group; Y and Z are each independently selected from F and —CF$_3$; a is an integer from 1 to 16; c is 0 or an integer from 1 to 5; b, d, e, f and g are each independently 0 or an integer from 1 to 200; and h is 0 or an integer from 1 to 16. In the general formula above, the moieties or units represented by the various subscripts may be present in any order any may be in randomized or block form.

Specific examples of the perfluoropolyether compound (b-1) include those disclosed in U.S. Pat. No. 6,906,115 B2, the disclosure of which is incorporated by reference herein in its entirety. In certain embodiments, the perfluoropolyether compound (b-1) includes the perfluoropolyether segment, which has a number average molecular weight of from 1,000 to 100,000, alternatively from 1,500 to 10,000, grams per mole (g/mol).

As set forth above, the monomeric compound (b-2) has a functional group other than and in addition to the active hydrogen atom. Typically, the functional group of the monomeric compound (b-2) is a self-crosslinking functional group. Self-crosslinking functional groups are those that are capable of undergoing a crosslinking reaction with one another, even though the self-crosslinking functional groups are the same. Specific examples of self-crosslinking functional group include radical polymerization reactive functional groups, cationic polymerization reactive functional groups, and functional groups only capable of optical crosslinking. Examples of radical polymerization reactive functional groups that are self-crosslinking include functional groups containing ethylenic unsaturation (e.g. a double bond (C=C)). Examples of cationic polymerization reactive functional groups that are self-crosslinking include cationic polymerization reactive ethylenic unsaturation, epoxy groups, oxetanyl groups, and silicon compounds containing alkoxysilyl groups or silanol groups. Examples functional groups only capable of optical crosslinking include photodimerisable functional groups of vinylcinnamic acid.

In certain embodiments, the monomeric compound (b-2) comprises a (meth)acrylate ester or vinyl monomer. In these embodiments, the monomeric compound (b-2) may have from 2 to 30, alternatively from 3 to 20, carbon atoms.

Specific examples of the monomeric compound (b-2) include hydroxyethyl (meth)acrylate; hydroxypropyl (meth)acrylate; hydroxybutyl (meth)acrylate; aminoethyl (meth)acrylate; HO(CH$_2$CH$_2$O)$_i$—COC(R$^1$)C=CH$_2$ (wherein R$^1$ is selected from H and CH$_3$; and i is an integer from 2 to 10); hydroxy-3-phenoxypropyl (meth)acrylate); allyl alcohol; HO(CH$_2$)$_j$CH=CH$_2$ (where j is an integer from 2 to 20); (CH$_3$)$_3$SiCH(OH)CH=CH$_2$; styryl phenol; and combinations thereof.

In certain embodiments, the fluoro-substituted compound (B) is formed by reacting (a) and (b-1) to form a reaction intermediate and then reacting the reaction intermediate and (b-2) to form the fluoro-substituted compound (B).

Additional aspects of this particular fluoro-substituted compound (B), including methods of its preparation, are disclosed in U.S. Pat. No. 8,609,742 B2, which is incorporated by reference herein in its entirety.

The curable composition further comprises (C) an organopolysiloxane having at least one acrylate group. The organopolysiloxane (C) may have two or more acrylate groups, e.g. from 2 to 20, alternatively from 2 to 10, acrylate groups. The acrylate groups may independently be terminal and/or pendant in the organopolysiloxane (C). The organopolysiloxane (C) may be linear, branched, cyclic, alicyclic, etc. and may have any structure including silicon-oxygen and at least one acrylate group. The acrylate group may be bonded directly to a silicon atom of the organopolysiloxane (C), linked to a silicon atom of the organopolysiloxane via divalent linking group, bonded to an atom other than silicon in the organopolysiloxane (e.g. carbon), etc.

The organopolysiloxane (C) typically includes silicon-bonded groups other than those including amino-substitution. Such silicon-bonded groups are generally monovalent and may be exemplified by alkyl groups, aryl groups, alkoxy groups, and/or hydroxyl groups. The organopolysiloxane (C) typically has a degree of polymerization of from 2 to 1000, alternatively from 2 to 500, alternatively from 2 to 300.

In certain embodiments, the organopolysiloxane (C) comprises the reaction product of a Michael addition reaction of an amino-substituted organopolysiloxane and a polyfunctional acrylate. The amino-substitution of the amino-substituted organopolysiloxane comprises at least one, e.g. from 2 to 10, amine-containing groups. The amine-containing groups may independently be primary or secondary but generally include at least one NH bond for the Michael addition reaction with the polyfunctional acrylate. Michael addition reactions are known in the art and involve nucleophilic addition. More specifically, the amino-substituted organopolysiloxane reacts with an acrylate functional group of the polyfunctional acrylate via the Michael addition reaction to form the organopolysiloxane (C) in these embodiments.

Specific examples of polyfunctional acrylates suitable for reacting via the Michael addition reaction with amino-substituted organopolysiloxane include those set forth above with respect to component (A). The polyfunctional acrylate may be the same as or different from the polyfunctional acrylate (A). The polyfunctional acrylate (A) may be utilized in excess in the curable composition such that the organopolysiloxane (C) is formed in situ from a portion of the polyfunctional acrylate (A) and the amino-substituted organopolysiloxane. Alternatively, the organopolysiloxane (C) is formed discretely and combined with the polyfunctional acrylate (A) and other components of the curable composition.

Generally one acrylate functional group of one molecule of the polyfunctional acrylate reacts with one amine-containing group of one molecule of the amino-substituted organopolysiloxane. In certain embodiments, there is but one amine-containing group in one molecule of the amino-substituted organopolysiloxane. Typically, the amine-containing group is terminal such that the resulting organopolysiloxane (C) is linear. However, the amine-containing group may be pendant in the amino-substituted organopolysiloxane such that the organopolysiloxane (C) is branched. Further, the amino-substituted organopolysiloxane may have two or more amine-containing groups. In these embodiments, each of the amine-containing groups of the amino-substituted organopolysiloxane may react with an acrylate functional group of the polyfunctional acrylate (and optionally each of the amine-containing groups of the amino-substituted organopolysiloxane may react with an acrylate functional group of different polyfunctional acrylate molecules).

The molar ratio of the amino-substituted organopolysiloxane and the polyfunctional acrylate utilized to form the organopolysiloxane (C) may vary. For example, when the amino-substituted organopolysiloxane includes but one amine-containing group, one mole of the amino-substituted organopolysiloxane group may react with one mole of the polyfunctional acrylate. However, because the polyfunctional acrylate includes two or more acrylate functional groups, two moles of the amino-substituted organopolysiloxane may react with one mole of the polyfunctional acrylate. Further, when the amino-substituted organopolysiloxane includes two or more amine-containing groups, one mole of the amino-substituted organopolysiloxane may react with more than one mole of the polyfunctional acrylate. The amino-substituted organopolysiloxane and the polyfunctional acrylate are typically reacted in a molar ratio of 10:1 to 1:10; alternatively from 5:1 to 1:5; alternatively from 2:1 to 1:2; of the amino-substituted organopolysiloxane to the polyfunctional acrylate to form the organopolysiloxane (C).

The Michael addition reaction between the amino-substituted organopolysiloxane and the polyfunctional acrylate may optionally be carried out in the presence of a solvent, vehicle and/or catalyst. Typically, the reaction is carried out in the absence of a solvent or vehicle, i.e., neat. Solvent can be any solvent different from the amino-substituted organopolysiloxane and the polyfunctional acrylate that is capable of solubilizing the amino-substituted organopolysiloxane and/or the polyfunctional acrylate. The vehicle may differ from the solvent in that the vehicle only partially solubilizes, alternatively does not solubilize, the amino-substituted organopolysiloxane and/or the polyfunctional acrylate.

Generally, no catalyst is required to initiate the Michael addition reaction between the amino-substituted organopolysiloxane and the polyfunctional acrylate. If desired, however, catalysts may be utilized to initiate and/or accelerate the Michael addition reaction between the amino-substituted organopolysiloxane and the polyfunctional acrylate. Suitable catalysts include bases of conjugated acids. Typically, the conjugated acids and their corresponding bases are organic. Specific examples of such bases include 1,4-dihydropyridines, methyl diphenylphosphane, methyl di-p-tolylphosphane, 2-allyl-N-alkyl imidazolines, tetra-t-butylammonium hydroxide, DBU (1,8-diazabicyclo[5.4.0]undec-7-ene) and DBN (1,5-diazabicyclo[4.3.0]non-5-ene), potassium methoxide, sodium methoxide, sodium hydroxide, and combinations thereof. If utilized, the catalyst is typically utilized in a concentration of from greater than 0 to 2.0, alternatively from 0.05 to 1.0, alternatively from 0.1 to 1.0, percent by weight based on the total weight of the amino-substituted organopolysiloxane and the polyfunctional acrylate.

The Michael addition reaction between the amino-substituted organopolysiloxane and the polyfunctional acrylate is typically carried out in a vessel. The vessel is typically heated to an elevated temperature, e.g. from 50 to 150, alternatively from 75 to 120, alternatively from 90 to 110, ° C. The vessel may be heated at the elevated temperature for a period of time to effect the Michael addition reaction between the amino-substituted organopolysiloxane and the polyfunctional acrylate, e.g. from 15 to 240, alternatively from 15 to 120, alternatively from 30 to 90, minutes. Progress of the Michael addition reaction to form the organopolysiloxane (C) may be monitored via various techniques, such as spectroscopy, e.g. infrared (IR) spectroscopy.

Specific examples of amino-substituted organopolysiloxanes suitable for forming the organopolysiloxane (C) via the Michael addition reaction include the following:

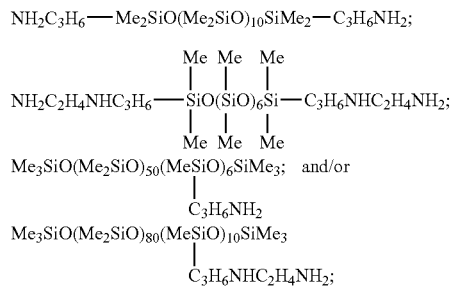

where Me designates a methyl group. Such amino-substituted organopolysiloxanes are merely exemplary examples. For example, the amino-substituted organopolysiloxane may have a different number of repeating disiloxy units, different substituents, different amino-substitution, etc.

Additional aspects of certain embodiments of the amino-substituted organopolysiloxane are disclosed in U.S. Pat. No. 8,178,613, which is incorporated by reference herein in its entirety.

Alternatively, the organopolysiloxane (C) need not be formed from the Michael addition reaction between the amino-substituted organopolysiloxane and the polyfunctional acrylate, i.e., the organopolysiloxane (C) may be prepared via other methods. For example, the organopolysiloxane (C) may be prepared by reacting an organopolysiloxane having at least one silicon-bonded hydrogen atom with an alkenyl-functional methacrylate compound, in which case the organopolysiloxane (C) is formed via hydrosilylation. One such specific example of an organopolysiloxane having at least one acrylate group suitable for the organopolysiloxane (C) is disclosed in U.S. Appln. Ser. No. 61/954,096, filed 2014 Mar. 17 (DC11806; H&H 071038.01436), entitled Fluorinated Compound, Curable Composition Comprising Same, and Cured Product, which is filed simultaneously herewith and incorporated by reference herein in its entirety.

The curable composition further comprises a reinforcing filler (D). The reinforcing filler (D) is utilized to provide increased hardness and scratch resistance to a cured product formed from the curable composition. The reinforcing filler (D) generally comprises silica. The silica may be any type of silica, e.g. the silica may be fumed silica, precipitated silica, colloidal silica, etc. Typically, the reinforcing filler (D) comprises colloidal silica.

Colloidal silica comprises a mixture or suspension of silica (i.e., silica particles) in a vehicle. The vehicle may alternatively be referred to as a dispersion medium. The silica particles of the colloidal silica are typically amorphous and nonporous.

The vehicle of the colloidal silica typically has a moderately low boiling point temperature for removal of the vehicle from the curable composition (and colloidal silica). For example, the vehicle typically has a boiling point temperature at atmospheric pressure (i.e., 1 atm) of from 30 to 200, alternatively from 40 to 150, degrees Celsius (° C.).

Suitable vehicles for the colloidal silica include polar and non-polar vehicles. Specific examples of such vehicles include water; alcohols, such as methanol, ethanol, isopropanol, n-butanol, and 2-methylpropanol; glycerol esters, such as glyceryl triacetate (triacetin), glyceryl tripropionate (tripropionin), and glyceryl tributyrate (tributyrin); polyglycols, such as polyethylene glycols and polypropylene glycols; cellosolves, such as methyl cellosolve, ethyl cellosolve and butyl cellosolve; dimethylacetamide; aromatics, such as toluene and xylene; acetates, such as methyl acetate; ethyl acetate; butyl acetate; ketones, such as methyl isobutyl ketone; acetic acid; and acetone. In specific embodiments, the vehicle of the colloidal silica is selected from water and an alcohol. The colloidal silica may alternatively be referred to as a colloidal silica dispersion. Two or more different vehicles may be utilized, although such vehicles are generally compatible with one another such that the colloidal silica is homogenous. The vehicle of the colloidal silica is typically present in the colloidal silica in a concentration of from, for example, 10 to 70 weight percent based on the total weight of the colloidal silica.

The silica particles of the colloidal silica typically have an average particle size less than 200 nanometers (nm), e.g. from 1 to 100, alternatively from 1 to 50, nanometers (nm).

The silica particles of the colloidal silica may be pure silicon dioxide, or may comprise a nominal amount of impurities, such as $Al_2O_3$, ZnO, and/or cations such as Nat, $K^+$, $Ca^{++}$, $Mg^{++}$, etc.

The colloidal silica may optionally be surface treated, e.g. with a filler treating agent. The colloidal silica may be surface treated prior to incorporation into the curable composition or may be surface treated in situ.

The amount of the filler treating agent utilized to treat the colloidal silica may vary depending on various factors, such as whether the colloidal silica is treated with the filler treating agent in situ or pretreated before being incorporated into the curable composition.

The filler treating agent may comprise a silane, such as an alkoxysilane; an alkoxy-functional oligosiloxane; a cyclic polyorganosiloxane; a hydroxyl-functional oligosiloxane, such as a dimethyl siloxane; methyl phenyl siloxane; a stearate; or a fatty acid.

Alkoxysilanes suitable for the filler treating agent are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alternatively, the alkoxysilane may include an ethylenically unsaturated group. The ethylenically unsaturated group may comprise a carbon-carbon double bond, a carbon-carbon triple bond, or combinations thereof. In these embodiments, the alkoxysilane may be represented by general formula $R^2_d ASi(OR^3)_{3-d}$. In this general formula, $R^2$ is a substituted or unsubstituted monovalent hydrocarbon group which contains no aliphatic unsaturated bond. Specific examples thereof include alkyl groups, aryl groups, and fluoroalkyl groups. $R^3$ is an alkyl group, typically having from 1 to 10 carbon atoms. A is a monovalent organic group having an aliphatic unsaturated bond. Specific examples of A include acryl group-containing organic groups, such as a methacryloxy group, an acryloxy group, a 3-(methacryloxy) propyl group and a 3-(acryloxy)propyl group; alkenyl groups, such as a vinyl group, a hexenyl group and an allyl group; a styryl group and a vinyl ether group. Subscript d is 0 or 1.

Specific examples of the alkoxysilane having an ethylenically unsaturated group include 3-(methacryloxy)propyltrimethoxysilane, 3-(methacryloxy)propyltriethoxysilane, 3-(methacryloxy) propylmethyldimethoxysi lane, 3-(acryloxy)propyltrimethoxysilane, vinyltrimethoxysilane, vinyltriethoxysilane, methylvinyldimethoxysilane and allyltriethoxysilane.

Alkoxy-functional oligosiloxanes may alternatively be used as the filler treating agent. Alkoxy-functional oligosiloxanes and methods for their preparation are known in the art. For example, suitable alkoxy-functional oligosiloxanes include those of the formula $(R^4O)_e Si(OSiR^4_2 R^5)_{(4-e)}$. In this formula, subscript e is 1, 2, or 3, alternatively 3. Each $R^4$ is independently selected from saturated and unsaturated hydrocarbyl groups having from 1 to 10 carbon atoms. Each $R^5$ is a saturated or unsaturated hydrocarbyl group.

Alternatively, silazanes may be utilized as the filler treating agent, either discretely or in combination with, for example, alkoxysilanes.

Alternatively still, the filler treating agent may an organosilicon compound. Examples of organosilicon compounds include, but are not limited to, organochlorosilanes such as methyltrichlorosilane, dimethyldichlorosilane, and trimethyl monochlorosilane; organosiloxanes such as hydroxy-end-blocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. Examples of stearates include calcium stearate. Examples of fatty acids include stearic acid, oleic acid, palmitic acid, tallow, coconut oil, and combinations thereof.

A residual amount of the filler treating agent may be present in the curable composition, e.g. as a discrete component separate from the colloidal silica.

Alternatively, the silica particles of the colloidal silica need not be surface treated with the treating agent. In these embodiments, the colloidal silica may be referred to as an unmodified colloidal silica. The unmodified colloidal silica is typically in the form of an acidic or basic dispersion.

If desired, an additional filler may be present in the curable composition, e.g. a filler other than colloidal silica. Examples thereof include alumina, calcium carbonate (e.g., fumed, fused, ground, and/or precipitated), diatomaceous earth, talc, zinc oxide, chopped fiber such as chopped KEVLAR®, onyx, beryllium oxide, zinc oxide, aluminum nitride, boron nitride, silicon carbide, tungsten carbide; and combinations thereof.

The curable composition may optionally further comprise (i) (E) water; (ii) (F) a carrier vehicle other than water (E); or (iii) (E) and (F).

If utilized, water (E) is present in the curable composition for hydrolysis of the reinforcing filler (D). For example, as known in the art, the silica particles of the colloidal silica may include silanol groups at a surface of the silica particles. Water (E) may be utilized as the vehicle of the colloidal silica, in which case water (E) is not needed as a discrete component in the curable composition. Further, if the colloidal silica is already surface treated, water (E) is similarly not typically utilized.

The carrier vehicle (F) is typically an alcohol-containing vehicle. The alcohol-containing vehicle may comprise, consist essentially of, or consist of an alcohol. The alcohol-containing vehicle is for dispersing the components of the curable composition. In certain embodiments, the alcohol-containing vehicle solubilizes the components of the curable composition, in which case the alcohol-containing vehicle may be referred to as an alcohol-containing solvent.

Specific examples of alcohols suitable for the alcohol-containing vehicle include methanol, ethanol, isopropyl alcohol, butanol, isobutyl alcohol, ethylene glycol, diethylene glycol, triethylene glycol, ethylene glycol monomethyl ether, diethylene glycol monomethyl ether, triethylene glycol monomethyl ether, and combinations thereof. When the alcohol-containing vehicle comprises or consists essentially of the alcohol, the alcohol-containing vehicle may further comprise an additional organic vehicle. Specific examples thereof include acetone, methyl ethyl ketone, methyl isobutyl ketone, or similar ketones; toluene, xylene, or similar aromatic hydrocarbons; hexane, octane, heptane, or similar aliphatic hydrocarbons; chloroform, methylene chloride, trichloroethylene, carbon tetrachloride, or similar organic chlorine-containing solvents; ethyl acetate, butyl acetate, isobutyl acetate, or a similar fatty acid ester. When the alcohol-containing vehicle comprises the additional organic vehicle, the alcohol-containing vehicle typically comprises the alcohol in an amount of from 10 to 90, alternatively from 30 to 70, weight percent based on the total weight of the alcohol-containing vehicle, with the balance of the alcohol-containing vehicle being the additional organic vehicle.

In various embodiments, the curable composition may additionally comprise a photopolymerization initiator (G). The photopolymerization initiator (G) is most commonly utilized if the curable composition is to be cured via irradiation with electromagnetic radiation. The photopolymerization initiator (G) may be selected from known compounds capable of generating a radical under irradiation with electromagnetic radiation, such as organic peroxides, carbonyl compounds, organic sulfur compounds and/or azo compounds.

Specific examples of suitable photopolymerization initiators (G) include acetophenone, propiophenone, benzophenone, xanthol, fluoreine, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone, diethoxyacetophenone, and combinations thereof.

If utilized, the photopolymerization initiator (G) is typically present in the curable composition in an amount of from 1 to 30, alternatively 1 to 20, parts by weight, based on 100 parts by weight of the polyfunctional acrylate (A).

If desired, the curable composition may further comprise a silane compound (H). Examples thereof include tetraalkoxysilanes, such as tetramethoxysilane, tetraethoxysilane and tetraisopropoxysilane; and alkylalkoxysilanes such as methyltrimethoxysilane, methyltriethoxysilane, methyltriisopropoxysilane, ethyltrimethoxysilane, ethyltriethoxysilane and ethyltriisopropoxysilane. The silane compound may be utilized as a discrete component or, as another example, to form a silsesquioxane in the curable composition.

Additional examples of additives that may be present in the curable composition include antioxidants; thickeners; surfactants, such as leveling agents, defoamers, sedimentation inhibitors, dispersing agents, antistatic agents and antifog additives; ultraviolet absorbers; colorants, such as various pigments and dyes; butylated hydroxytoluene (BHT); phenothiazine (PTZ); and combinations thereof.

The curable composition may be prepared via various methods involving the combination of the various components of the curable composition. In certain embodiments, the colloidal silica is surface treated prior to incorporation into the curable composition. The components may individually or collectively be heated before, during, or after the preparation of the curable composition.

The curable composition may be utilized in a variety of end uses and applications. Most typically, the curable composition is utilized to form a cured product. The cured product may be in the form of a fiber, a coating, a layer, a film, a composite, an article, etc.

The invention additionally provides a cured product formed from the curable composition and a method of forming the cured product with the curable composition. The cured product and method of forming the cured product are described together below.

The method of forming the cured product comprises applying the curable composition on a substrate. The method further comprises curing the curable composition on the substrate so as to form the cured product on the substrate. For example, the method of forming the cured product comprises applying the curable composition on the substrate to form a wet layer thereof on the substrate. The method further comprises curing the wet layer to form the cured product.

The substrate is not limited and may be any substrate upon which it is desirable to form the cured product. For example, the substrate may comprise an electronic article, an optical article, consumer appliances and components, automotive bodies and components, polymeric articles, etc. The substrate may have any shape or configuration.

Examples of electronic articles typically include those having electronic displays, such as liquid crystal displays (LCDs), light-emitting diode (LED) displays, organic light-emitting diode (OLED) displays, plasma displays, etc. These electronic displays are often utilized in various electronic devices, such as computer monitors, televisions, smart phones, global positioning systems (GPS) units, music players, remote controls, hand-held video games, portable readers, automobile display panels, etc.

Thus, the invention provides an article comprising the cured product and a substrate, the cured product being disposed on the substrate. The article may comprise an electronic article, an optical article, consumer appliance or a component thereof, an automotive body or a component thereof, or a polymeric article. The article may comprise a sensor.

In some embodiments the article may be a sensor. As used herein, a sensor is a device that detects external events or changes in quantities and provides an appropriate output. To illustrate, the sensor may be a thermocouple that detects temperature or changes in temperature and provides an appropriate voltage output. The sensor may comprise a detecting surface in contact with an external environment and configured for detecting the external events or changes in quantities. The detecting surface may be in communication with a signal processor for converting the detected external events or changes in quantities into the appropriate output. The sensor's output may be in the form of an electrical and/or optical signal. The sensor may be a physical sensor, chemical sensor, or biosensor. The physical sensor may be configured for measuring temperature, pressure, light intensity or wavelength, sound intensity or frequency, or electrical signals. The chemical sensor may be configured for measuring chemical compositions such as detecting presence of or measuring concentration of analytes such as water, molecular oxygen or ozone, carbon monoxide, carbon dioxide, nitrogen oxides, sulfur oxides, hydrogen sulfide, or chemical warfare agents. The biosensor may be configured for detecting presence of or measuring extent of enzymatic activity in vitro, detecting presence of or measuring concentration of a drug or metabolite ex vivo, or detecting or recognizing skin patterns (bioprint) or features in vivo.

In some embodiments the sensor is a biosensor, and the biosensor is a bioprint sensor. The bioprint being detected or measured may be any distinguishing skin feature of animal anatomy, including human anatomy, such as a fingerprint (including thumbprint), palmprint, footprint, earprint, pawprint, or the like. The bioprint sensor may be optical based, ultrasonic based, thermal line based, pressure sensitive based, or capacitance based. The bioprint sensor may capture a digital image of a skin pattern using visible light (optical based), high frequency sound waves (ultrasonic based), temperature variations across grooves, bumps and ridges (thermal line based), pressure differences between grooves, bumps and ridges (pressure sensitive based), or differences between grooves, bumps and ridges in subdermal skin layer conductivity (capacitance based). The bioprint sensor may comprise a sensor array of sensor pixels, wherein each sensor pixel is configured to detect an external event or change in quantity at its location in the sensor array, and produce an appropriate output for that location. The bioprint sensor may map outputs from each sensor pixel in the sensor array and thereby produce a composite image in the form of a visual or electronic image of the bioprint. The composite image may depict the bioprint in two-dimensions or three-dimensions. For example, a fingerprint comprising bumps, ridges and grooves (valleys between ridges) may be imaged by a capacitance-based fingerprint sensor, which may produce a composite image of the fingerprint from a sensor array of capacitance sensor pixels disposed over different locations on bumps, ridges or grooves of the fingerprint. The composite image may be a two-dimensional bump/ridge pattern or a three-dimensional topographical image.

In some embodiments the sensor is a (human) fingerprint sensor. The fingerprint sensor may be optical based, ultrasonic based, thermal line based, pressure sensitive based, or capacitance based. In some embodiments the fingerprint sensor may be an optical fingerprint sensor, alternatively a capacitance-based fingerprint sensor. The fingerprint sensor may be part of an electronic device in need of fingerprint sensing, such as personal electronic devices that employ biometric scanners such as personal computers, smartphones, computing tablets, electronic readers, and the like.

Accordingly, the invention provides the sensor or an electronic device comprising the sensor, wherein the detecting surface of the sensor has coated thereon a film of the inventive cured product formed from the inventive curable composition. The invention also provides a method of forming the film of the cured product on the detecting surface of the sensor, the method comprising applying the curable composition to a detecting surface of the sensor to form a film of the curable composition on the detecting surface of the sensor, and curing the curable composition of the film to give the film of the cured product on the detecting surface of the sensor. In some embodiments the sensor is the biosensor, alternatively the bioprint sensor, alternatively the fingerprint sensor, alternatively the optical fingerprint sensor, alternatively the capacitance-based fingerprint sensor.

The film is oleophobic (e.g., repels skin oils) and hydrophobic (i.e., repels water). As such the film may enable a fingerprint sensor to function even if the finger being used is wet (e.g., as indicated by testing with artificial sweat) or excessively oily (e.g., as indicated by testing with sebum). The film of the inventive cured product on the detecting surface of the sensor may be thick enough to provide oleophobic and hydrophobic coating effects even after repeated use of the sensor (i.e., the film is not so thin that the film would be easily wiped off under normal use). The film may be a monolayer film, alternatively a multilayer film. The film may also be thin enough for the particular type of sensor (e.g., optical based, ultrasonic based, thermal line based, pressure sensitive based, or capacitance based) that it does not prevent the sensor from detecting the external events or changes in quantities. In some embodiments the film has a thickness of from 5 micrometers (μm) to 100 μm.

The extent to which a suitable film for the sensor is oleophobic may be determined by applying a quantity of hexadecane on the surface of the detector element of the sensor, and then measuring a static hexadecane contact angle, as described later. The extent to which a suitable coating composition is hydrophobic may be determined by applying a quantity of deionized water on the surface of the detector element of the sensor, and then measuring a water contact angle, as described later. As such, the film that is both oleophobic and hydrophobic may have a Water Contact Angle >100° and a Hexadecane Contact Angle >50°.

FIG. 1a (top left) shows a photographic image of a regular (not wet) fingerprint on a coated plastic board, wherein the coating is a film of the inventive cured product of an inventive composition. FIG. 1b (top right) shows a photographic image of a regular (not wet) fingerprint on an uncoated plastic board. FIG. 1c (bottom left) shows a photographic image of a wet (water) fingerprint on a coated plastic board, wherein the coating is as used for FIG. 1a. FIG. 1d (bottom right) shows a photographic image of a wet (water) fingerprint on an uncoated plastic board. As can be seen by comparing FIG. 1a with FIG. 1b, the inventive film increases the ridge definition and fidelity of the fingerprint image of a regular (not wet or excessively oily) fingerprint as compared to a fingerprint on a plastic board without any oleophobic and hydrophobic film thereon. As can be seen by comparing FIG. 1b with FIG. 1d, the presence of water on a finger significantly degrades the clarity and fidelity of the fingerprint image compared to that of a regular (not wet or excessively oily) fingerprint, wherein the fingerprints were obtained from an uncoated plastic board, i.e., without any oleophobic and hydrophobic film thereon. As can be seen by comparing FIG. 1c with FIG. 1d, the inventive film increases the ridge definition and fidelity of the fingerprint image of a wet (water) fingerprint obtained with the coated plastic board as compared to an uncoated plastic board without any oleophobic and hydrophobic film thereon.

As introduced above, the substrate may also be a metal article, such as consumer appliances and components. Exemplary articles include a dishwasher, a stove, a microwave, a refrigerator, a freezer, etc, typically having a glossy metal appearance, such as stainless steel, brushed nickel, aluminum, etc.

Alternatively, the substrate may be a vehicle body or component such as an automotive body or component. For example, the curable composition may be applied directly on a top coat of an automobile body to form the layer, which imparts the automobile body with a glossy appearance, which is aesthetically pleasing and resists stains, such as dirt, etc., as well as smudges from fingerprints.

Examples of suitable optical articles include inorganic materials, such as glass plates, glass plates comprising an inorganic layer, ceramics, and the like. Additional examples of suitable optical articles include organic materials, such as transparent plastic materials and transparent plastic materials comprising an inorganic layer, etc. Specific examples of optical articles include antireflective films, optical filters, optical lenses, eyeglass lenses, beam splitters, prisms, mirrors, etc.

Specific examples of organic materials and/or polymeric articles include polyolefins (e.g. polyethylene, polypropylene, etc.), polycycloolefins, polyesters (e.g. polyethylene terephthalate, polyethylene naphthalate, etc.), polyamides (e.g. nylon 6, nylon 66, etc.), polystyrene, polyvinyl chloride, polyimides, polyvinyl alcohol, ethylene vinyl alcohol, acrylics (e.g. polymethyl methacrylate), celluloses (e.g. triacetylcellulose, diacetylcellulose, cellophane, etc.), or copolymers of such organic polymers. It is to be appreciated that these materials may be utilized in ophthalmic elements. Non-limiting examples of ophthalmic elements include corrective and non-corrective lenses, including single vision or multi-vision lenses like bifocal, trifocal and progressive lenses, which may be either segmented or non-segmented, as well as other elements used to correct, protect, or enhance vision, including without limitation contact lenses, intraocular lenses, magnifying lenses and protective lenses or visors. Preferred material for ophthalmic elements comprises one or more polymers selected from polycarbonates, polyamides, polyimides, polysulfones, polyethylene terephthalate and polycarbonate copolymers, polyolefins, especially polynorbornenes, diethylene glycol-bis(allyl carbonate) polymers—known as CR39- and copolymers, (meth)acrylic polymers and copolymers, especially (meth) acrylic polymers and copolymers derived from bisphenol A, thio(meth)acrylic polymers and copolymers, urethane and thiourethane polymers and copolymers, epoxy polymers and copolymers, and episulfide polymers and copolymers.

The substrate may comprise any of the materials described above while being different from the particular articles recited herein. For example, the substrate may comprise a metal or alloy that is not part of a consumer appliance or vehicle body.

In addition to the articles/substrates described above, the curable composition may be applied to other substrates, such as window members for automobiles or airplanes, thus providing advanced functionality.

Alternatively still, the substrate may comprise cement, stone, paper, cardboard, ceramic, etc.

Alternatively or in addition, the substrate may comprise an antireflective coating. In these embodiments, the antireflective coating may include one or more layers of material disposed on an underlying substrate. The antireflective coating generally has a lesser refractive index than the underlying substrate. The antireflective coating may be multilayer. Multi-layer antireflective coatings include two or more layers of dielectric material on the underlying substrate, wherein at least one layer has a refractive index higher than the refractive index of the underlying substrate. Such multi-layer antireflective coatings are often referred to as antireflective film stacks.

The antireflective coating may be formed from a wide variety of materials. In certain embodiments, the antireflective coating comprises a thin metal oxide film, such as a thin sputter coated metal oxide film. Alternatively, the thin metal oxide film may be formed via thermal evaporation. "Metal oxides," as used herein, include oxides of single metals (including metalloids) as well as oxides of metal alloys. One example of a metal oxide is a silicon oxide, which may be depleted of oxygen (i.e., wherein the amount of oxygen in the oxide is less than the stoichiometric amount). Additional suitable metal oxides include oxides of tin, titanium, niobium, zinc, zirconium, tantalum, yttrium, aluminum, cerium, tungsten, bismuth, indium, and mixtures thereof. Specific examples include $SiO_2$, $SnO_2$, $TiO_2$, $Nb_2O_5$, $ZnO$, $ZrO_2$, $Ta_2O_5$, $Y_2O_3$, $Al_2O_3$, $CeO_2$, $WO_3$, $Bi_2O$, $In_2O_3$, and ITO (indium tin oxide), as well as combinations and alternating layers thereof.

If desired, the underlying substrate may have a primed surface prior to deposition of the antireflective coating. For example, the primed surface may be formed by the application of a chemical primer layer, such as an acrylic layer, or from chemical etching, electronic beam irradiation, corona treatment, plasma etching, or co-extrusion of adhesion promoting layers. Such primed substrates are commercially available.

The method by which the curable composition is applied on the substrate may vary. For example, in certain embodiments, the step of applying the curable composition on the substrate uses a wet coating application method. Specific examples of wet coating application methods suitable for the method include dip coating, spin coating, flow coating, spray coating, roll coating, gravure coating, sputtering, slot coating, and combinations thereof. The alcohol-containing vehicle, along with any other vehicles or solvents preset in the curable composition and wet layer, may be removed from the wet layer via heating or other known methods.

The curable composition may be applied on the substrate to any thickness to provide the desired level of water, oil, stain, and soil repellency. In certain embodiments, the cured product may alternatively be referred to as a layer or film, although the cured product may have any shape or form other than that associated with layers or films. In these embodiments, the cured product has a thickness of from greater than 0 to 20, alternatively from greater than 0 to 10, alternatively from greater than 0 to 5, micrometers ($\mu$m). In certain embodiments, the cured product has a thickness of at least 15, alternatively at least 20, alternatively at least 30, Angstroms, with the upper limit in such embodiments being 20 $\mu$m.

The curable composition, as well as the wet layer formed therefrom, can be rapidly cured by being irradiated with active-energy rays (i.e., high-energy rays). The active-energy rays may comprise ultraviolet rays, electron beams, or other electromagnetic waves or radiation. The use of ultraviolet rays is preferable from the point of view of low cost and high stability. A source of ultraviolet radiation may comprise a high-pressure mercury lamp, medium-pressure mercury lamp, Xe—Hg lamp, or a deep UV lamp.

The step of curing the wet layer generally comprises exposing the wet layer to radiation at a dosage sufficient to cure at least a portion, alternatively the entirety, of the wet layer. The dosage of radiation for curing the wet layer is typically from 10 to 8000 milliJoules per centimeter squared ($mJ/cm^2$). In certain embodiments, heating is used in conjunction with irradiation for curing the wet layer. For example, the wet layer may be heated before, during, and/or after irradiating the wet layer with active-energy rays. While active energy-rays generally initiate curing of the curable composition, residual amounts of the alcohol-containing vehicle or any other vehicles and/or solvents may be present in the wet layer, which may be volatilized and driven off by heating. Typical heating temperatures are in the range of from 50 to 200° C. Curing the wet layer provides the cured product.

The cured product includes a host matrix with the reinforcing filler (D) being dispersed in the host matrix. The host matrix is formed from a reaction of the polyfunctional acrylate (A), the fluoro-substituted compound having an aliphatic unsaturated bond (B), and the organopolysiloxane having at least one acrylate group (C). The reinforcing filler (D) is generally homogenously dispersed in the host matrix of the cured product, although the reinforcing filler (D) may be heterogeneously dispersed in the host matrix or otherwise in varying concentrations across any dimension of the cured product.

The cured product has excellent physical properties and is suitable for use as protective coatings on a variety of substrates. For example, the cured product has excellent (i.e., high) hardness, durability, adhesion to the substrate, and resistance to staining, smudging, and scratching. In certain embodiments, the cured product has a water contact angle of at least 90, alternatively at least 100, alternatively at least 105, alternatively at least 108, alternatively at least 110, degrees (°). In these embodiments, the upper limit is typically 120°. The water contact angle of the cured product is typically within this range even after subjecting the cured product to an abrasion test, which illustrates the excellent durability of the cured product. For example, for cured products having a lesser durability, the water contact angle decreases after abrasion, which generally indicates that the cured product has at least partially deteriorated.

In these embodiments, the cured product also typically has a sliding (kinetic) coefficient of friction ($\mu$) of from greater than 0 to less than 0.2, alternatively from greater than 0 to less than 0.15, alternatively from greater than 0 to less than 0.125, alternatively from greater than 0 to less than 0.10. Although coefficient of friction is unitless, it is often represented by ($\mu$).

For example, sliding (kinetic) coefficient of friction may be measured by disposing an object having a determined surface area and mass onto the cured product with a select material (e.g. a standard piece of legal paper) between the object and the cured product. A force is then applied perpendicular to gravitational force to slide the object across the cured product for a predetermined distance, which allows for a calculation of the sliding coefficient of friction of the cured product.

The appended claims are not limited to expressed and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

In some embodiments the invention is any one of the following numbered aspects.

Aspect 1. A curable composition, comprising: (A) a polyfunctional acrylate; (B) a fluoro-substituted compound having an aliphatic unsaturated bond; (C) an organopolysiloxane having at least one acrylate group; and (D) a reinforcing filler.

Aspect 2. The curable composition of aspect 1 wherein (B): (i) is partially fluorinated; (ii) comprises a perfluoropolyether segment; or (iii) both (i) and (ii).

Aspect 3. The curable composition of aspect 2 wherein (B) comprises said perfluoropolyether segment, said perfluoropolyether segment comprising moieties of general formula (1): $-(C_3F_6O)_x-(C_2F_4O)_y-(CF_2)_z-$ (1); wherein subscripts x, y, and z are each independently selected from 0 and an integer from 1 to 40, with the proviso that x, y, and z are not simultaneously 0.

Aspect 4. The curable composition of any one preceding aspect wherein (B) comprises the reaction product of a reaction of: (a) a triisocyanate and (b) a mixture of (b-1) a perfluoropolyether compound having at least one active hydrogen atom; and (b-2) a monomeric compound having an active hydrogen atom and a functional group other than the active hydrogen atom.

Aspect 5. The curable composition of aspect 4 wherein (b-1) has at least one terminal hydroxy group.

Aspect 6. The curable composition of any one of aspects 4 and 5 wherein (B) is formed by reacting (a) and (b-1) to form a reaction intermediate and then reacting the reaction intermediate and (b-2) to form (B).

Aspect 7. The curable composition of any one preceding aspect wherein (C) comprises the reaction product of a Michael addition reaction of an amino-substituted organopolysiloxane and a polyfunctional acrylate.

Aspect 8. The curable composition of any one preceding aspect further comprising: (i) (E) water; (ii) (F) a carrier vehicle other than water; or (iii) (E) and (F).

Aspect 9. The curable composition of any one preceding aspect wherein (D) comprises colloidal silica.

Aspect 10. The curable composition of any one preceding aspect wherein (D) is surface treated with an organoalkoxysilane having an aliphatic unsaturated bond.

Aspect 11. A cured product formed by curing a curable composition which comprises: (A) a polyfunctional acrylate; (B) a fluorine-containing compound having an aliphatic unsaturated bond; (C) an organopolysiloxane having at least one acrylate group; and (D) a reinforcing filler; wherein (D) is dispersed in said cured product and said curable composition.

Aspect 12. The cured product of aspect 11 comprising a film having a thickness of from greater than 0 to 20 micrometers (μm).

Aspect 13. The cured product of any one of aspects 11 and 12 being disposed on a substrate.

Aspect 14. The cured product of any one of aspects 10-13 having a water contact angle of at least 100°.

Aspect 15. A method of forming a cured product, said method comprising: applying the curable composition of aspect 1 on a substrate; and curing the curable composition on the substrate so as to form the cured product on the substrate.

Aspect 16. An article comprising the cured product of any one of aspects 11-14 and a substrate, the cured product being disposed on the substrate.

Aspect 17. The article of aspect 16 comprising an electronic article, an optical article, consumer appliance or a component thereof, an automotive body or a component thereof, or a polymeric article.

Aspect 18. The article of aspect 17 comprising a sensor.

The following examples are intended to illustrate the invention and are not to be viewed in any way as limiting to the scope of the invention.

EXAMPLES

Example 1 and Comparative Examples 1-3

Table 1 below illustrates the components utilized to prepare curable compositions along with their respective amounts for Example 1 and Comparative Examples 1-3. The values in Table 1 are in grams.

TABLE 1

| Component: | Example 1 | Comparative Example 1 | Comparative Example 2 | Comparative Example 3 |
|---|---|---|---|---|
| Polyfunctional Acrylate (A) | 23.9 | 23.9 | 23.9 | 23.9 |
| Fluoro-substituted Compound (B) | 2.25 | 0 | 2.25 | 0 |
| Organopolysiloxane (to form (C)) | 1.5 | 0 | 0 | 1.5 |
| Reinforcing Filler (D) | 45.0 | 45.0 | 45.0 | 45.0 |
| Water (E) | 0.46 | 0.46 | 0.46 | 0.46 |
| Carrier Vehicle (F) | 52.3 | 52.3 | 52.3 | 52.3 |
| Carrier Vehicle (F') | 21.0 | 21.0 | 21.0 | 21.0 |
| Photopolymerization Initiator (G) | 2.25 | 2.25 | 2.25 | 2.25 |
| Filler Treating Agent | 3.7 | 3.7 | 3.7 | 3.7 |

Polyfunctional Acrylate (A) comprises a blend of dipentaerythritol hexaacrylate and dipentaerythritol pentaacrylate (1:1 molar ratio), commercially available under the tradename Kayarad dPHA from Nippon Kayaku Co., Ltd. of Tokyo, Japan.

Fluoro-substituted Compound (B) comprises a fluoro-substituted compound having an aliphatic unsaturated bond, commercially available under the tradename Optool™ Dac HP from Daikin Industries, Ltd. of Osaka, Japan.

Organopolysiloxane (to form (C)) comprises an aminopropyl-terminated poly(dimethyl)siloxane having a viscosity at 25 C of from 20 to 30 centiStokes (cSt), commercially available under the name DMS-A12 from Gelest Inc. of Morrisville, Pa.

Reinforcing Filler (D) comprises a colloidal silica monodispersed in isopropanol (30 wt. % $SiO_2$), commercially available under the tradename ORGANOSILICASOL™ IPA-ST from Nissan Chemical America Corporation of Houston, Tex.

Water (E) comprises deionized water.

Carrier Vehicle (F) comprises toluene.

Carrier Vehicle (F') comprises 2-propanol.

Photopolymerization Initiator (G) comprises 1-hydroxycyclohexyl phenyl ketone, commercially available under the tradename Irgacure® 184 from BASF Corporation of Florham Park, N.J.

Filler Treating Agent comprises 3-methacryloxypropyl trimethoxysilane.

Example 1

The Carrier Vehicle (F), Carrier Vehicle (F'), Polyfunctional Acrylate (A), and Organopolysiloxane (to form (C)) are disposed in a three neck dry flask and stirred for one hour at 50° C. The Organopolysiloxane (to form (C)) reacts with a portion of the Polyfunctional Acrylate (A) via a Michael addition reaction so as to form an Organopolysiloxane having at least one acrylate functional group (C). As such, the Organopolysiloxane (to form (C)) is a precursor for forming the Organopolysiloxane (C), which is formed in situ via the Michael addition reaction between the Organopolysiloxane (to form (C)) and a portion of the Polyfunctional Acrylate (A). The Filler Treating Agent, Reinforcing Filler (D), and Water (E) are disposed in the flask and the contents of the flask are heated at 50° C. while stirring for another hour. The Filler Treating Agent reacts in situ to surface treat the Reinforcing Filler (D). The contents of the flask are cooled to room temperature. The Photopolymerization Initiator (G) and Fluoro-substituted Compound (B) are disposed in the flask to give the curable composition. The curable composition of Example 1 is a clear colorless solution.

Comparative Example 1

The Carrier Vehicle (F), Carrier Vehicle (F'), Polyfunctional Acrylate (A), Filler Treating Agent, Reinforcing Filler (D), and Water (E) are disposed in a three neck dry flask and heated at 50° C. while stirring for one hour. The Filler Treating Agent reacts in situ to surface treat the Reinforcing Filler (D). The contents of the flask are cooled to room temperature. The Photopolymerization Initiator (G) is disposed in the flask to give the curable composition. The curable composition of Comparative Example 1 is also clear colorless solution. The curable composition of Comparative Example 1 differs from that of Example 1 because the curable composition of Comparative Example 1 does not include the Fluoro-substituted Compound (B) or the Organopolysiloxane (to form (C)) (or the Organopolysiloxane (C) having an acrylate functional group, which is formed in situ in Example 1).

Comparative Example 2

The Carrier Vehicle (F), Carrier Vehicle (F'), Polyfunctional Acrylate (A), Filler Treating Agent, Reinforcing Filler (D), and Water (E) are disposed in a three neck dry flask and heated at 50° C. while stirring for one hour. The Filler Treating Agent reacts in situ to surface treat the Reinforcing Filler (D). The contents of the flask are cooled to room temperature. The Photopolymerization Initiator (G) and Fluoro-substituted Compound (B) are disposed in the flask to give the curable composition. The curable composition of Comparative Example 2 is also clear colorless solution. The curable composition of Comparative Example 2 differs from that of Example 1 because the curable composition of Comparative Example 2 does not include the Organopolysiloxane (to form (C)) (or the Organopolysiloxane (C) having an acrylate functional group, which is formed in situ in Example 1).

Comparative Example 3

The Carrier Vehicle (F), Carrier Vehicle (F'), Polyfunctional Acrylate (A), and Organopolysiloxane (to form (C)) are disposed in a three neck dry flask and stirred for one hour at 50° C. The Organopolysiloxane (to form (C)) reacts with a portion of the Polyfunctional Acrylate (A) via a Michael addition reaction so as to form an Organopolysiloxane having at least one acrylate functional group (C). As such, the Organopolysiloxane (to form (C)) is a precursor for forming the Organopolysiloxane (C), which is formed in situ via the Michael addition reaction between the Organopolysiloxane (to form (C)) and a portion of the Polyfunctional Acrylate (A). The Filler Treating Agent, Reinforcing Filler (D), and Water (E) are disposed in the flask and the contents of the flask are heated at 50° C. while stirring for another hour. The Filler Treating Agent reacts in situ to surface treat the Reinforcing Filler (D). The contents of the flask are cooled to room temperature. The Photopolymerization Initiator (G) is disposed in the flask to give the curable composition. The curable composition of Comparative Example 3 is also a clear colorless solution. The curable composition of Comparative Example 3 differs from that of Example 1 because the curable composition of Comparative Example 3 does not include the Fluoro-substituted Compound (B).

Cured Products:

The curable compositions of Example 1 and Comparative Examples 1-3 are filtered via a syringe filter (polytetrafluoroethylene with glass microfiber; 30 millimeter (mm) diameter; 0.45 micrometer (μm) pore size; commercially available under the tradename Whatman® from GE Healthcare of Little Chalfront, U.K.). Samples of the curable compositions of Example 1 and Comparative Examples 1-3 are applied to different substrates (polycarbonate, polymethylmethacrylate, and finished polished aluminum). Specifically, the samples of the curable compositions are applied to the different substrates via spin coating with a spin-coater (commercially available from SUSS MicroTec of Sunnvale, Calif.) at 200 rotations per minute (rpm) for 20 seconds and then 1,000 rpm for 30 seconds to provide wet films on the different substrates. The wet films are dried for 10 minutes at 70° C. and cured via UV irradiation at a dosage of 2 J/cm$^2$ for a period of time sufficient to cure the wet films and give cured products. The cured products are in the form of thin films disposed on the different substrates.

Physical properties of the cured products formed from the curable compositions of Example 1 and Comparative Examples 1-3 are measured as described below.

Contact Angle:

The static contact angles of water and hexadecane on each of the cured products are evaluated. Specifically, the static contact angles of water and hexadecane are measured via a VCA Optima XE goniometer, which is commercially available from AST Products, Inc., Billerica, Mass. The water contact angle measured is a static contact angle based on a 2 μL droplet on each of the cured products. The contact angle of water is referred to as WCA (water contact angle), and the contact angle of hexadecane is referred to as HCA (hexadecane contact angle). The WCA and HCA values are degrees (°).

Pencil Hardness:

The pencil hardness of each of the cured products is measured in accordance with ASTM D3363-04(2011)32, entitled "Standard Test Method for Film Hardness by Pencil Test." Pencil hardness values are generally based on graphite grading scales, which range from 9H (hardest value) to 9B (softest value).

Cross Hatch Adhesion Test:

The cross hatch adhesion test is performed in accordance with ASTM D 3002, entitled "Evaluation of Coatings Applied to Plastics" and ASTM D 3359-09e2, entitled "Standard Test Methods for Measuring Adhesion by Tape Test" utilizes right angle cuts (which are cross-hatched) in the cured products to the underlying substrates. The cracking of cutting edges and loss of adhesion is inspected based on the ASTM standard below:

ASTM class 5B: The cutting edges are completely smooth and none of the squares in the lattice formed from the cross hatch test are detached from the underlying substrate;

ASTM class 4B: Detachment of small flakes of the cured products at intersecting cuts; a cross cut area not significantly greater than 5% by area is affected;

ASTM Class 3B: The cured product has flaked along the cutting edges and at intersecting cuts; a cross cut area significantly greater than 5%, but not significantly greater than 15%, by area is affected;

ASTM class 2B: The cured product has flaked along the cutting edges partly or wholly in large ribbons, and/or has flaked partly or wholly on different squares in the lattice formed from the cross hatch test; a cross cut area significantly greater than 15%, but not significantly greater than 35%, by area is affected;

ASTM class 1 B: The cured product has flaked along the cutting edges in large ribbons and/or some squares in the lattice formed from the cross hatch test have detached partly or wholly from the underlying substrate; a cross cut area significantly greater than 35%, but not significantly greater than 65%, by area is affected;

ASTM Class 0B: Any degree of flaking that cannot be classified as ASTM class 1 B-5B.

Anti-Abrasion Test:

The anti-abrasion test utilizes a reciprocating abraser—Model 5900, which is commercially available from Taber Industries of North Tonawanda, N.Y. The abrading material utilized is a CS-17 Weaser® from Taber Industries. The abrading material has dimensions of 6.5 mm×12.2 mm. The reciprocating abraser is operated for 10, 25, and 100 cycles at a speed of 25 cycles per minute with a stroke length of 1 inch and a load of 10.0 N. Following each of the cycles, the surfaces of the cured products are visually inspected to determine abrasion. The following ratings are assigned based on this optical inspection:

Rating 1: no damage to the cured product;
Rating 2: minor scratches to the cured product;
Rating 3: moderate scratches to the cured product;
Rating 4: substrate is partially visible through the cured product; and
Rating 5: substrate is fully visible through the cured product.

Stain Marker Test:

The stain marker tests measures optically the ability of the cured products to exhibit stain resistance. In particular, in the stain marker test, a line is drawn on each of the cured products with a Super Sharpie® permanent marker (commercially available from Newell Rubbermaid Office Products of Oak Brook, Ill.). The lines are inspected optically to determine whether the lines beaded on the cured products. A "1" ranking indicates that the line fully beads into a small droplet, whereas a "5" ranking indicates that the line does not bead whatsoever. Thirty seconds after drawing each line on the cured products, the line is wiped with a piece of paper (Kimtech Science™ Kimwipes™, commercially available from Kimberly-Clark Worldwide, Inc. of Irving, Tex.) five consecutive times. A "1" ranking indicates that the line (or beaded portion thereof) is fully removed from the substrate, whereas a "5" ranking indicates that the line is not removed whatsoever.

Contact Angle Durability Test:

Durability of the cured products is measured via the contact angle durability test, which measures the WCA and HCA after abrasion of the cured products. Generally, the greater the WCA or HCA after abrasion, the more durable the cured product. The WCA and HCA are measured as described above after abrasion of the cured products. Abrasion of the cured products is carried out via the reciprocating abraser—Model 5900, which is commercially available from Taber Industries of North Tonawanda, N.Y. The abrading material utilized is a microfiber cloth (Wypall™, commercially available from Kimberly-Clark Worldwide, Inc. of Irving, Tex.) having an area of 2×2 centimeters (cm). The reciprocating abraser is operated 10,000 cycles at a speed of 60 cycles per minute with a load of 250 grams.

Coefficient of Friction (COF) Test:

The COF is measured via a TA-XT2 Texture Analyzer, commercially available from Texture Technologies of Scarsdale, N.Y. The COF is measured by placing a sled having a load of about 156 grams onto each of the cured products with a piece of standard paper disposed between each of the cured products and the sled. The sled has an area of about 25×25 millimeters. A force is applied in a direction perpendicular to gravity to move the sled along each of the layers at a speed of about 2.5 millimeters/sec for a distance of about 42 millimeters to measure the COF. Although COF is unitless, it is often represented by μ. The standard deviation of the COF is also included below.

Tables 2 and 3 below illustrate the physical properties of each of the cured products (and on the particular substrate) based on the tests described above. In Tables 2 and 3, "PC" designates a polycarbonate substrate; "PMMA" designates a polymethylmethacrylate substrate; "Al" designates finished polished aluminum; "Ex." designates Example; and "C.E." designates Comparative Example.

TABLE 2

|  | Substrate | Pencil Hardness | Cross-Hatch Adhesion | Staining Initial | Staining Wiped | Contact Angle WCA (°) | Contact Angle HCA (°) |
|---|---|---|---|---|---|---|---|
| C. E. 1 | PC | 1H | 5B | 5 | 5 | 55.3 | 23.4 |
|  | PMMA | 9H | 5B | 5 | 5 | 56.1 | 25.7 |
|  | Al | 9H | 5B | 5 | 5 | 62.1 | 21.9 |
| C. E. 2 | PC | 1H | 5B | 1 | 0 | 114.9 | 67.6 |
|  | PMMA | 9H | 5B | 1 | 0 | 115.0 | 68.1 |
|  | Al | 9H | 5B | 1 | 0 | 114.7 | 66.2 |
| C. E. 3 | PC | 1H | 5B | 2 | 0 | 98.8 | 34.7 |
|  | PMMA | 9H | 5B | 2 | 0 | 99.6 | 36.4 |
|  | Al | 9H | 5B | 2 | 0 | 98.9 | 37.0 |
| Ex 1 | PC | 1H | 5B | 1 | 0 | 114.4 | 65.6 |
|  | PMMA | 9H | 5B | 1 | 0 | 115.1 | 66.4 |
|  | Al | 9H | 5B | 1 | 0 | 115.5 | 67.7 |

TABLE 3

|  | Substrate | Anti-abrasion 10 cycles | Anti-abrasion 25 cycles | Anti-abrasion 100 cycles | Contact Angle Durability WCA (°) | Contact Angle Durability HCA (°) | COF |
|---|---|---|---|---|---|---|---|
| C. E. 1 | PC | 1 | 2 | 3 | 71.2 | 34.5 | 0.711 +/− 0.024 |
|  | PMMA | 1 | 2 | 3 | 69.6 | 23.4 | 0.726 +/− 0.021 |
|  | Al | 1 | 2 | 3 | 81.4 | 16.4 | 0.694 +/− 0.015 |
| C. E. 2 | PC | 1 | 2 | 3 | 105.5 | 63.8 | 0.128 +/− 0.017 |
|  | PMMA | 1 | 2 | 3 | 104.5 | 61.2 | 0.135 +/− 0.044 |
|  | Al | 1 | 2 | 3 | 107.7 | 61.3 | 0.131 +/− 0.037 |
| C. E. 3 | PC | 1 | 2 | 3 | 75.9 | 30.5 | 0.071 +/− 0.023 |
|  | PMMA | 1 | 2 | 3 | 96.2 | 34.0 | 0.080 +/− 0.026 |
|  | Al | 1 | 2 | 3 | 96.3 | 25.3 | 0.078 +/− 0.022 |
| Ex 1 | PC | 1 | 2 | 3 | 111.2 | 66.2 | 0.095 +/− 0.008 |
|  | PMMA | 1 | 2 | 3 | 113.4 | 66.8 | 0.097 +/− 0.015 |
|  | Al | 1 | 2 | 3 | 112.5 | 66.4 | 0.100 +/− 0.018 |

As clearly illustrated in Tables 2 and 3 above, the physical properties of the cured product formed via the inventive curable composition of Example 1 are superior to those of the cured products formed from the curable compositions of Comparative Examples 1-3. Specifically, the cured products formed via the inventive curable composition of Example 1 have significantly increased durability (based on the WCA and HCA after abrasion) as compared to the cured products formed from the curable compositions of Comparative Examples 1-3. In fact, the WCA and HCA after abrasion for the cured product formed from the curable composition of Example 1 is nearly twice as great as the WCA and HCA of the cured products formed from the curable compositions of Comparative Examples 1 and 3. As noted above, the only differences between the curable compositions of Example 1 and Comparative Examples 1-3 relate to the presence or absence of claimed components (B) and (C), as conditions and relative amounts of components are otherwise identical in these examples.

The invention has been described in an illustrative manner, and the terminology which has been used is intended to be in the nature of words of description rather than of limitation. Obviously, many modifications and variations of the present invention are possible in light of the above teachings. The invention may be practiced otherwise than as specifically described.

What is claimed is:

1. A curable composition, comprising:
   (A) a polyfunctional acrylate;
   (B) a fluoro-substituted compound having an aliphatic unsaturated bond, wherein (B) comprises the reaction product of a reaction of:
      (a) a triisocyanate and
      (b) a mixture of
         (b-1) a perfluoropolyether compound having at least one active hydrogen atom; and
         (b-2) a monomeric compound having an active hydrogen atom and a functional group other than the active hydrogen atom;
   (C) an organopolysiloxane having at least one acrylate group; and
   (D) a reinforcing filler.

2. The curable composition of claim 1 wherein (B): (i) is partially fluorinated; (ii) comprises a perfluoropolyether segment; or (iii) both (i) and (ii).

3. The curable composition of claim 2 wherein (B) comprises said perfluoropolyether segment, said perfluoropolyether segment comprising moieties of general formula (1):

$$—(C_3F_6O)_x—(C_2F_4O)_y—(CF_2)_z— \quad (1);$$

wherein subscripts x, y, and z are each independently selected from 0 and an integer from 1 to 40, with the proviso that x, y, and z are not simultaneously 0.

4. The curable composition of claim 1 wherein (b-1) has at least one terminal hydroxy group.

5. The curable composition of claim 1 wherein (B) is formed by reacting (a) and (b-1) to form a reaction intermediate and then reacting the reaction intermediate and (b-2) to form (B).

6. The curable composition of claim 1 wherein (C) comprises the reaction product of a Michael addition reaction of an amino-substituted organopolysiloxane and a polyfunctional acrylate.

7. The curable composition of claim 1 wherein (D) comprises colloidal silica; or wherein (D) is surface treated with an organoalkoxysilane having an aliphatic unsaturated bond; or wherein (D) comprises colloidal silica and the colloidal silica is surface treated with an organoalkoxysilane having an aliphatic unsaturated bond.

8. The curable composition of claim 1 further comprising: (i) (E) water; (ii) (F) a carrier vehicle other than water; or (iii) (E) and (F).

9. A cured product formed by curing a curable composition which comprises:
   (A) a polyfunctional acrylate;
   (B) a fluorine-containing compound having an aliphatic unsaturated bond, wherein (B) comprises the reaction product of a reaction of:
      (a) a triisocyanate and
      (b) a mixture of
         (b-1) a perfluoropolyether compound having at least one active hydrogen atom; and
         (b-2) a monomeric compound having an active hydrogen atom and a functional group other than the active hydrogen atom;
   (C) an organopolysiloxane having at least one acrylate group; and
   (D) a reinforcing filler;
   wherein (D) is dispersed in said cured product and said curable composition.

10. The cured product of claim 9, the cured product comprising a film having a thickness of from greater than 0 to 20 micrometers (μm); or the cured product being disposed on a substrate; or the cured product comprising a film having a thickness of from greater than 0 to 20 micrometers (μm), wherein the film is disposed on a substrate.

11. The cured product of claim 9 having a water contact angle of at least 100°.

12. A method of forming a cured product, said method comprising:
   applying the curable composition of claim 1 on a substrate; and
   curing the curable composition on the substrate so as to form the cured product on the substrate.

13. An article comprising the cured product of claim 9 and a substrate, the cured product being disposed on the substrate.

14. The article of claim 13, the article comprising an electronic article, an optical article, consumer appliance or a component thereof, an automotive body or a component thereof, or a polymeric article; or the article comprising a sensor.

* * * * *